United States Patent Office 3,079,408
Patented Feb. 26, 1963

3,079,408
3,16-BISOXYGENATED 17-HALOESTRA-1,3,5(10)-TRIENES
George P. Mueller, Park Ridge, Ill., assignor to G. D. Searle & Co., Chicago, Ill., a corporation of Delaware
No Drawing. Filed Apr. 17, 1961, Ser. No. 103,267
7 Claims. (Cl. 260—397.4)

The present invention relates to novel 17-halogenated steriods, and especially to 3,16-bisoxygenated 17-halo-estra-1,3,5(10)-trienes, which can be represented by the structural formula

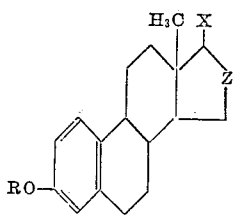

wherein R is selected from the group consisting of hydrogen, lower alkyl, and lower alkanoyl radicals; X is a halogen atom; and Z is selected from the group consisting of carbonyl, hydroxymethylene, and (lower alkanoyl) oxy-methylene radicals. Lower alkyl radicals represented by R are exemplified by methyl, ethyl, propyl, butyl, pentyl, hexyl, and the branched-chain isomers thereof. The lower alkanoyl radicals encompassed by R and Z are, for example, formyl, acetyl, propionyl, butyryl, valeryl, caproyl, and the branched-chain isomers thereof; said groups being the acyl radicals of alkanoic acids containing fewer than 7 carbon atoms.

This application is a continuation-in-part of my co-pending application, Serial No. 835,416, filed August 24, 1959, and now abandoned.

Suitable starting materials for the manufacture of the instant compounds are the appropriately 3-oxygenated 16,17 - epoxyestra - 1,3,5(10) - trienes. Dehydrobromination of the 3-oxygenated 16α,17β-halohydrins, prepared by the method disclosed at J. Org. Chem. 23, 1190 (1958), affords the β-epoxides, as typified by the reaction of 16α-bromo-3-methoxyestra-1,3,5(10) - trien-17β - ol with methanolic potassium hydroxide to afford 3-methoxy - 16β,17β-epoxyestra-1,3,5(10) - triene. Reaction of these β-epoxides with a hydrohalogen acid results in the instant 17α,16β-halodydrins. One the other hand, reaction of the α-epoxides, prepared by epoxidation of the corresponding 16-dehydro derivatives with perbenzoic acid, with a hydrohalogen acid produces 17β,16α-halohydrins of this invention. Specific examples of these processes are the reaction of hydrogen fluoride in tetrahydrofuran with 16β,17β-epoxy-3-methoxyestra-1,3,5(10) - triene or with 16α,17α-epoxy - 3 - methoxyestra-1,3,5(10)-triene to afford 17α-fluoro-3-methoxyestra-1,3,5(10)-trien-16β-ol and 17β-fluoro-3-methoxyestra-1,3,5(10)-trien-16α-ol, respectively.

Oxidation of the aforementioned halohydrins, typically with chromium trioxide in pyridine, results in the corresponding 17-halo 16-ketones. For example, the reaction of 17α-bromo-3-methoxyestra-1,3,5(10)-trien - 16β-ol with chromium trioxide in pyridine, affords 17α-bromo-3-methoxyestra-1,3,5(10)-trien-16-one.

Reaction of the aforementioned 17-halo 16-ketones with a suitable reducing agent produces the halohydrins of this invention wherein the configurations of the halogen and hydroxy substituents are the same. Thus, treatment of 17α-bromo-3-methoxyestra-1,3,5(10)-trien - 16 - one or 17β - bromo-3-methoxyestra-1,3,5(10)-trien-16-one with lithium aluminum hydride in tetrahydrofuran affords 17α-bromo-3-methoxyestra-1,3,5(10) - trien-16α-ol and 17β-bromo - 3 - methoxyestra-1,3,5(10)-trien-16α-ol, respectively.

The 17β-halo 16-ketones of this invention can be manufactured also by epimerization of the corresponding 17α-halo compounds. This process is specifically illustrated by the reaction of 17α-bromo-3-methoxyestra-1,3,5(10)-trien-16-one with p-toluenesulfonic acid to afford 17α-bromo-3-methoxyestra-1,3,5(10)-trien-16-one.

Although the 16,17 - epoxy-3-hydroxyestra-1,3,5(10)-trienes can be used as such to achieve the instant 3-hydroxy compounds, the phenolic moiety is preferably protected by a lower alkanoyl group in order to prevent any possible oxidative decomposition. Thus, 16α-bromo-3-hydroxyestra-1,3,5(10)-trien-17β-ol is reacted with methanolic potassium hydroxide to afford 16β,17β - epoxy-3-hydroxyestra-1,3,5(10)-triene, which is treated with a lower alkanoic acid anhydride in pyridine to afford the corresponding 3-(lower alkanoate). This ester can be, of course, treated as described in detail supra, to afford the 3-hydroxy compounds of this invention.

The instant 3,16-di-(lower alkanoates) are preferably manufactured by reaction of the corresponding 3,16-diols with a lower alkanoic acid anhydride in pyridine. As a specific example, 17β - bromo-3-hydroxyestra-1,3,5(10)-trien-16β-ol is treated with acetic anhydride in pyridine to yield 3,16β - diacetoxy - 17β-bromoestra - 1,3,5(10)-triene.

On the other hand, treatment of a 3,16-diol of this invention with a limited quantity of a lower alkanoic acid anhydride in pyridine results in production of an instant 3-(lower alkanoate).

The compounds of this invention are useful as result of their valuable pharmacological properties. They are, for example, estrogens in consequence of their ability to promote uterine growth and to produce characteristic changes in the vaginal epithelium.

The invention will appear more fully from the examples which follow. These examples are set forth by way of illustration only and it will be understood that the invention is not to be construed as limited in spirit or in scope of the details contained therein, as many modifications in materials and methods will be apparent from this disclosure to those skilled in the art. In these examples temperatures are given in degrees Centigrade (° C.). Quantities of materials are expressed in parts by weight except where otherwise noted.

*Example 1*

A solution of 6 parts of potassium hydroxide and 4.3 parts of 16α-bromo-3-methoxyestra-1,3,5(10)-trien-17β-ol in 150 parts of methanol is heated at reflux for about 19 hours. The solution is cooled and diluted with water, and the resulting crystalline product washed well with water and dried. This substance is purified by adsorption on silica gel, elution with 25% benzene in hexane, and recrystallization from ether to afford pure 16β, 17β-epoxy-3 - methoxyestra - 1,3,5(10) - triene, M.P. 116–116.5°; $[\alpha]_D = +115°$ (chloroform).

By substituting an equivalent quantity of 3-n-propoxy-16β-bromoestra-1,3,5(10)-trien-17β-ol or 3-acetoxy-16α-bromoestra-1,3,5(10)-trien-17β-ol and otherwise proceeding according to the herein described processes, 16β, 17β-epoxy-3-n-propoxyestra-1,3,5(10)-triene and 16β,17β-epoxy-3-hydroxyestra-1,3,5(10)-triene are obtained.

*Example 2*

To a solution of one part of 16β,17β-epoxy-3-methoxyestra-1,3,5(10)-triene in 38 parts of chloroform is added at 0–5°, 15 parts of 48% aqueous hydrobromic acid, and the mixture stirred for about 5 minutes. The chloroform layer is separated, washed with water, dried over anhydrous magnesium sulfate and evaporated to dryness in vacuo. The residue is extracted with ether and the extract clarified by centrifugation, then evaporated to dryness in vacuo to yield 17α-bromo-3-methoxyestra-1,3,5(10)-trien-16β-ol. This bromohydrin displays an infrared maximum at 2.77 microns.

By substituting equivalent quantities of 16β,17β-epoxy-3-hydroxyestra-1,3,5(10)-triene or 16β,17β-epoxy-3-n-propoxyestra-1,3,5(10)-triene and otherwise proceeding according to the herein described processes, 17α-bromo-3-hydroxyestra-1,3,5(10)-trien-16β-ol and 17α-bromo-3-n-propoxyestra-1,3,5(10)-trien-16β-ol are obtained.

*Example 3*

To a solution of one part of 16β,17β-epoxy-3-methoxyestra-1,3,5(10)-triene in 38 parts of chloroform is added, at 0–5°, 24 parts of concentrated hydrochloric acid and the mixture shaken for about 15 minutes. The chloroform layer is separated, washed with water, dried over anhydrous magnesium sulfate and evaporated to dryness in vacuo. The residue is extracted with ether and the extract clarified by centrifugation, then evaporated to dryness in vacuo to yield 17α-chloro-3-methoxyestra- 1,3,5(10)-trien-16β-ol, which exhibits a maximum in the infrared at 2.77 microns.

By substituting an equivalent quantity of concentrated hydriodic acid and otherwise proceeding according to the herein described processes, 17α-iodo-3-methoxyestra-1,3,5(10)-trien-16β-ol, which displays an infrared maximum at 2.77 microns, is obtained.

*Example 4*

To a solution of 3 parts of anhydrous hydrogen fluoride in 7.5 parts of tetrahydrofuran is added at −70°, with stirring, a solution of one part of 16β,17β-epoxy-3-methoxyestra-1,3,5(10)-triene in 40 parts of chloroform. Stirring is continued at −70° for about 30 minutes, then at −30° for about one hour. The reaction mixture is treated with excess aqueous potassium carbonate and the organic layer separated, washed with water, dried over anhydrous magnesium sulfate, and concentrated to dryness in vacuo, to yield 17α-fluoro-3-methoxyestra-1,3,5(10)-trien-16β-ol, M.P. about 146–149°.

*Example 5*

To a suspension of 2.4 parts of chromium trioxide in 24 parts of pyridine is added, with stirring, a solution of 1.2 parts of 17α-bromo-3-methoxyestra-1,3,5(10)-trien-16β-ol in 12 parts of pyridine. Stirring at room temperature is continued for about 3 hours, then water added and the mixture extracted with ether. The ether layer is separated, washed successively with water, dilute hydrochloric acid, water and saturated aqueous sodium chloride; then dried over anhydrous magnesium sulfate and concentrated to an oil in vacuo. This oil is adsorbed on silica gel, eluted with chloroform, and the eluate evaporated to yield an oil which crystallizes on standing. Recrystallization from ether affords pure 17α-bromo-3-methoxyestra-1,3,5(10)-trien-16-one, M.P. 133.5–136.5°; [α]$_D$=−5° (chloroform).

The substitution of an equivalent quantity of 17α-chloro-3-methoxyestra-1,3,5(10)-trien-16β-ol in the instant process results in pure 17α-chloro-3-methoxyestra-1,3,5(10)-trien-16-one, M.P. 111.1–112.5°; [α]$_D$=−49° (chloroform).

*Example 6*

To a stirred solution of one part of lithium aluminum hydride in 70 parts of dry ether is added, at 0° over a period of about 10 minutes, a solution of 6.45 parts of 17α-bromo-3-methoxyestra-1,3,5(10)-trien-16-one in 54 parts of tetrahydrofuran. The reaction mixture is treated successively with water and excess dilute hydrochloric acid, then extracted with ether. The organic layer is separated, washed successively with water and aqueous sodium bicarbonate, dried over anhydrous magnesium sulfate, and evaporated to an oil in vacuo. The residue is adsorbed on fuller's earth and eluted with 40% benzene in heptane. Evaporation of the eluate affords an oil which crystallizes on standing. Recrystallization from acetone-pentane yields pure 17α-bromo-3-methoxyestra-1,3,5(10)-trien-16α-ol, M.P. 125–126.5°; [α]$_D$=+7.9° (chloroform).

*Example 7*

A mixture of 2 parts of 17α-bromo-3-methoxyestra-1,3,5(10)-trien-16-one, 5 parts of p-toluenesulfonic acid, and 100 parts of acetic acid is heated at reflux for about 68 hours. The reaction mixture is diluted with water and extracted with benzene. The organic layer is separated, washed with water, dried over anhydrous sodium sulfate, and concentrated to dryness at reduced pressure. A benzene solution of the residue is chromatographed on silica gel. Elution of the column with 1% ethyl acetate in benzene and concentration of the eluate to dryness affords a solid residue which is recrystallized first from methylene chloride-methanol, then from methanol to afford 17β-bromo-3-methoxyestra-1,3,5(10)-trien-16-one, M.P. about 226–229°; [α]$_D$=−100°.

*Example 8*

The substitution of an equivalent quantity of 17α-chloro-3-methoxyestra-1,3,5(10)-trien - 16 - one in the process of Example 7 results in 17β-chloro-3-methoxyestra-1,3,5(10)-trien-16-one, M.P. about 211–213°; [α]$_D$=−92°.

*Example 9*

To a stirred solution of 7 parts of lithium aluminum hydride in 700 parts of ether is added, at −5° over a period of several minutes, a solution of 15 parts of 17β-bromo-3-methoxyestra-1,3,5(10)-trien-16-one in 355 parts of tetrahydrofuran. The reaction mixture is treated successively with 50 parts of water and 10 parts of 10% aqueous sodium hydroxide, filtered through a bed of anhydrous magnesium sulfate containing a filter aid and evaporated to dryness at reduced pressure. The resulting residue is recrystallized from acetone-petroleum ether, then from petroleum ether to produce 17β-bromo-3-methoxyestra-1,3,5(10)-trien-16β-ol, M.P. about 150–151°; [α]$_D$=+70°.

*Example 10*

A mixture of one part of 17α-bromo-3-hydroxyestra-1,3,5(10)-trien-16β-ol, 10 parts of acetic anhydride, and 20 parts of pyridine is warmed on the steam bath to achieve homogeneity, then allowed to stand at room temperature for about 16 hours. The reaction mixture is diluted with water and extracted with ether. The organic solution is washed successively with aqueous sodium bicarbonate and water, dried over anhydrous magnesium sulfate, and evaporated to dryness in vacuo to yield 3,16β-diacetoxy-17α-bromoestra-1,3,5(10)-triene.

Substitution of an equivalent quantity of n-butyric anhydride in the instant process results in 3,16β-di-n-butyroxy-17α-bromoestra-1,3,5(10)-triene.

*Example 11*

To a solution of 6 parts of 17α-bromo-3-hydroxyestra-1,3,5(10)-trien-16β-ol in 800 parts of acetone is added dropwise, at 10–15°, 5.5 parts by volume of an aqueous solution containing 1.47 parts of chromium trioxide and 2.34 parts of concentrated sulfuric acid. The reaction mixture is stirred for about 5 minutes, then diluted with water and extracted with benzene. The benzene solution is washed successively with water and aqueous potassium bicarbonate, dried over anhydrous magnesium sulfate and evaporated to dryness in vacuo. Recrystallization from acetone-hexane affords pure 17α-bromo-3-hydroxyestra-1,3,5(10)-trien-16-one, which exhibits infrared maxima at 2.77 and 5.70 microns.

*Example 12*

A mixture of 2 parts of 17α-bromo-3-hydroxyestra- 1,3,5(10)-trien-16-one, 10 parts of acetic anhydride, and 20 parts of pyridine is allowed to stand at room temperature for about 15 hours. The reaction mixture is diluted with water and extracted with benzene. The organic layer is separated, washed successively with water and aqueous potassium bicarbonate, dried over anhydrous magnesium sulfate, and concentrated to dryness in vacuo. The crude product can be recrystallized from aqueous ethanol to produce pure 3-acetoxy-17α-bromoestra-1,3,5(10)-trien-16-one. This substance displays maxima in the infrared at 5.70 microns.

Example 13

A mixture of 3.5 parts of 17α-bromo-3-hydroxyestra-1,3,5(10)-trien-16β-ol, one part of acetic anhydride, and 20 parts of pyridine is allowed to stand at room temperature for about 16 hours. The reaction mixture is diluted with water and the resulting mixture extracted with benzene. The benzene solution is washed successively with aqueous potassium bicarbonate solution and water, dried over anhydrous magnesium sulfate, and evaporated to dryness in vacuo. The residue is adsorbed on silica gel and eluted with chloroform to afford 3-acetoxy-17α-bromoestra-1,3,5(10)-trien-16β-ol which displays infrared maxima at 2.77 and 5.70 microns.

Example 14

By substituting an equivalent quantity of 17β-chloro-3-methoxyestra-1,3,5(10)-trien-16-one and otherwise proceeding according to the procedure of Example 9, 17β-chloro-3-methoxyestra-1,3,5(10)-trien-16β-ol is obtained.

Example 15

The substitution of an equivalent quantity of 17α-bromo-3-methoxyestra-1,3,5(10) - trien - 16β - ol or 17β-chloro-3-methoxyestra-1,3,5(10)-trien-16β-ol in the process of Example 10 results in 16β-acetoxy-17α-bromo-3-methoxyestra-1,3,5(10)-triene and 16β-acetoxy-17β-chloro-3-methoxyestra-1,3,5(10)-triene.

Example 16

The substitution of one part of 16α,17α-epoxy-3-methoxyestra-1,3,5(10)-triene in the process of Example 4 results in 17β-fluoro-3-methoxyestra-1,3,5(10)-trien-16α-ol, M.P. about 74–76°; $[\alpha]_D = +18°$.

Example 17

The substitution of an equivalent quantity of 17α-fluoro-3-methoxyestra-1,3,5(10) - trien - 16β - ol or 17β-fluoro-3-methoxyestra-1,3,5(10)-trien-16α-ol in the procedure of Example 4 affords 17α-fluoro-3-methoxyestra-1,3,5(10)-trien-16-one, M.P. about 148–149°

($[\alpha]_D = -191°$)

and 17β-fluoro-3-methoxyestra-1,3,5(10)-trien - 16 - one, M.P. about 155–156°, respectively.

What is claimed is:

1. A member selected from the group consisting of compounds of the structural formulae

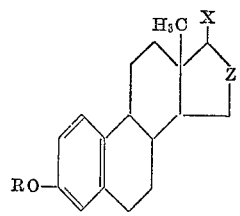

and

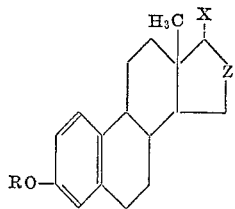

wherein R is selected from the group consisting of hydrogen, lower alkyl, and lower alkanoyl radicals; X is a halogen atom, and Z is selected from the group consisting of carbonyl, hydroxymethylene, and (lower alkanoyl)-oxymethylene radicals.

2. 17-bromo-3-methoxyestra-1,3,5(10)-trien-16-one.
3. 17-chloro-3-methoxyestra-1,3,5(10)-trien-16-one.
4. 17-bromo-3-methoxyestra-1,3,5(10)-trien-16-ol.
5. 17-chloro-3-methoxyestra-1,3,5(10)-trien-16-ol.
6. 17-fluoro-3-methoxyestra-1,3,5(10)-trien-16-one.
7. 17-fluoro-3-methoxyestra-1,3,5(10)-trien-16-ol.

No references cited.